(No Model.)

T. B. THOMAS.
TREE PROTECTOR.

No. 245,413. Patented Aug. 9, 1881.

Witnesses.
H. E. Lodge
F. G. Simpson

Inventor.
Theodore B. Thomas

UNITED STATES PATENT OFFICE.

THEODORE B. THOMAS, OF QUINCY, MASSACHUSETTS.

TREE-PROTECTOR.

SPECIFICATION forming part of Letters Patent No. 245,413, dated August 9, 1881.

Application filed May 25, 1881. (No model.)

*To all whom it may concern:*

Be it known that I, THEODORE B. THOMAS, a citizen of the United States, residing at Quincy, in the county of Norfolk and State of Massachusetts, have invented certain new and useful Improvements in Tree-Protectors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This protector is of the class in which an annular trough containing a destructive liquid surrounds and is supported by the tree, and is provided with a water-shed or cover, the space intervening between the tree and trough being packed with a suitable material to prevent passage of insects thereat and cause them to be intercepted and destroyed by the contents of the trough in their attempts to ascend the tree.

My invention consists, first, in a sheet-metal plate corrugated transversely and formed into a ring to encircle the butt of a tree, the said ring, when in place, being concavo-convex in vertical cross-section, and having secured to its lower edge a vertical annular wall or ledge, which, in combination with the outwardly-flaring lower portion of the ring, constitutes an annular trough to contain the insect-destroying liquid or oil.

My invention also consists in other peculiarities of construction and combination, as hereinafter set forth.

Figure 1:
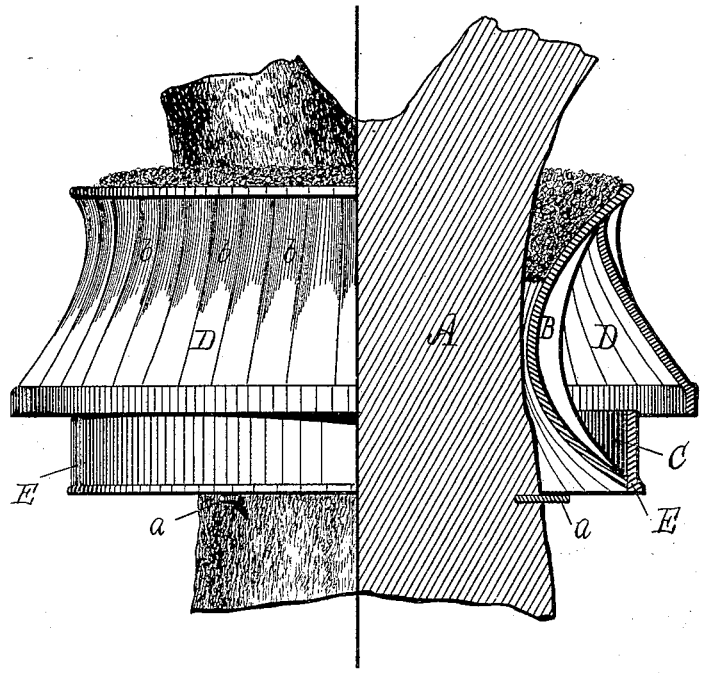
Figure 2:
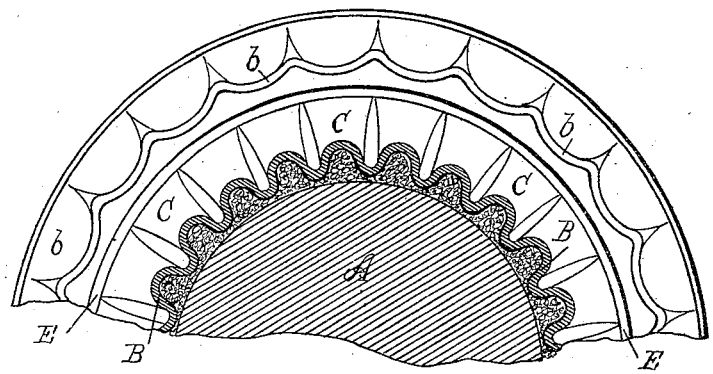

The drawings accompanying this specification represent, in Figure 1, a sectional elevation of a tree with my protector applied thereto. Fig. 2 is a horizontal section, showing the corrugations.

In these drawings, A represents the trunk of a tree. B represents a vertical annular plate surrounding said tree and supported in position thereon and above the ground by several pins or nails, *a a*, driven horizontally into the tree.

In forming the ring B, I provide a plate or strip of sheet metal, (preferably zinc on account of its ductility and non-corrosive properties,) and I run this strip through a series of properly-shaped fluted rollers, by which it is corrugated transversely, with the corrugations preferably vanishing at the top edges of the plate, the act of running the plate through the rolls tending to partially convert it into a ring, which is twisted to separate its ends, in order that it may be passed about the tree, and its ends then brought together and soldered. The form of the rolls is such that the ring B is concavo-convex in vertical cross-section and flaring away from the tree at top and bottom, as represented, by which means I produce the inner wall of the trough C, and I cause the water-shed or annular-cover D to stand away from the tree.

To complete the trough I secure to the lower edge of the ring B a vertical strip, E, which constitutes an annular wall or ledge, while the upper edge of the cover D is secured to the upper edge of said ring B. To enable the cover D to flare outwardly to an extent sufficient to cover the trough C, I corrugate its upper part with vertical or peripheral corrugations, as shown at *b b*.

When the protector is applied to a tree, the upper portion of the space intermediate between such tree and the ring B is to be packed with tow or other suitable material, which shall not interfere with the health of the tree, and which shall prevent passage of insects.

By corrugating the ring B, as explained, I permit of passage of the sap and also avoid all possibility of girdling or injuring the tree, and the spaces between the swells of the corrugations also stiffen the material of the ring and render the latter so rigid that it cannot sag and allow the oil in the trough to escape.

By flaring the ring B at top the requisite amount of packing material may be employed, while at the same time this material is prevented from escaping downward between the tree and trough.

By providing a vertical outer wall to the trough the escape of the contents of the latter by currents of wind is prevented.

Having thus explained the nature, purposes, and advantages of my invention, I claim and desire to secure by Letters Patent the following:

1. In tree-protectors, a ring to horizontally encircle the tree, composed of a metal plate corrugated transversely and concavo-convex in cross-section, substantially as stated.

2. In tree-protectors, a ring to horizontally encircle the tree, composed of a metal plate corrugated transversely, concavo-convex in cross-section, and flaring away from the tree at top and bottom, and carrying at top an annular cap to cover the trough and protect its contents from rain, leaves, dust, &c., substantially as and for the purposes set forth.

3. In tree-protectors, a ring to horizontally encircle the tree, composed of a metal plate corrugated transversely, concavo-convex in vertical cross-section, and flaring away from the tree at top and bottom, carrying at top an outwardly-flaring annular cap to cover the trough, and at bottom an annular trough to contain the insect-destroying material, substantially as described.

4. The ring corrugated transversely, as shown, and flaring away from the tree at the bottom to form the inner wall of the trough, and at top to prevent the downward escapement of the packing, the said ring having a vertical outer wall erected upon its lower edge to form a trough, substantially as and for the purposes herein set forth.

In testimony whereof I affix my signature in presence of two witnesses.

THEODORE B. THOMAS.

Witnesses:
H. E. LODGE,
F. G. SIMPSON.